United States Patent [19]

Ikemori et al.

[11] Patent Number: 4,730,199
[45] Date of Patent: Mar. 8, 1988

[54] PHOTOGRAPHIC APPARATUS

[75] Inventors: Keiji Ikemori, Kanagawa; Ichiro Ohnuki; Masaharu Eguchi, both of Tokyo, all of Japan

[73] Assignee: Canon Kabushiki Kaisha

[21] Appl. No.: 795,619

[22] Filed: Nov. 6, 1985

[30] Foreign Application Priority Data

Nov. 9, 1984 [JP] Japan ................... 59-236322

[51] Int. Cl.$^4$ ............................................. G03B 19/12
[52] U.S. Cl. ..................................... 354/152; 358/906
[58] Field of Search ......................... 354/152; 358/906

[56] References Cited

U.S. PATENT DOCUMENTS

| | | | |
|---|---|---|---|
| 3,463,929 | 8/1969 | Laurent | 354/152 X |
| 3,751,136 | 8/1973 | Kirchhoff | 354/152 X |
| 3,955,206 | 5/1976 | Hashimoto | 354/152 |
| 3,956,759 | 5/1976 | Karikawa | 354/152 X |
| 4,037,238 | 7/1977 | Leitz et al. | 354/152 |
| 4,567,535 | 1/1986 | Kinjo | 358/906 X |

*Primary Examiner*—Donald A. Griffin
*Attorney, Agent, or Firm*—Toren, McGeady & Associates

[57] ABSTRACT

A photographic apparatus comprising an objective including a front lens unit for forming an image of an object and a rear lens unit, a beam splitter arranged between the front and rear lens units for splitting an optical path, a viewfinder including a roof type prism and an eyepiece and arranged on the optical path split by the beam splitter so as to observe the object image by the front lens unit, and an image receiver on which an object image of different magnification is formed by the objective.

13 Claims, 2 Drawing Figures

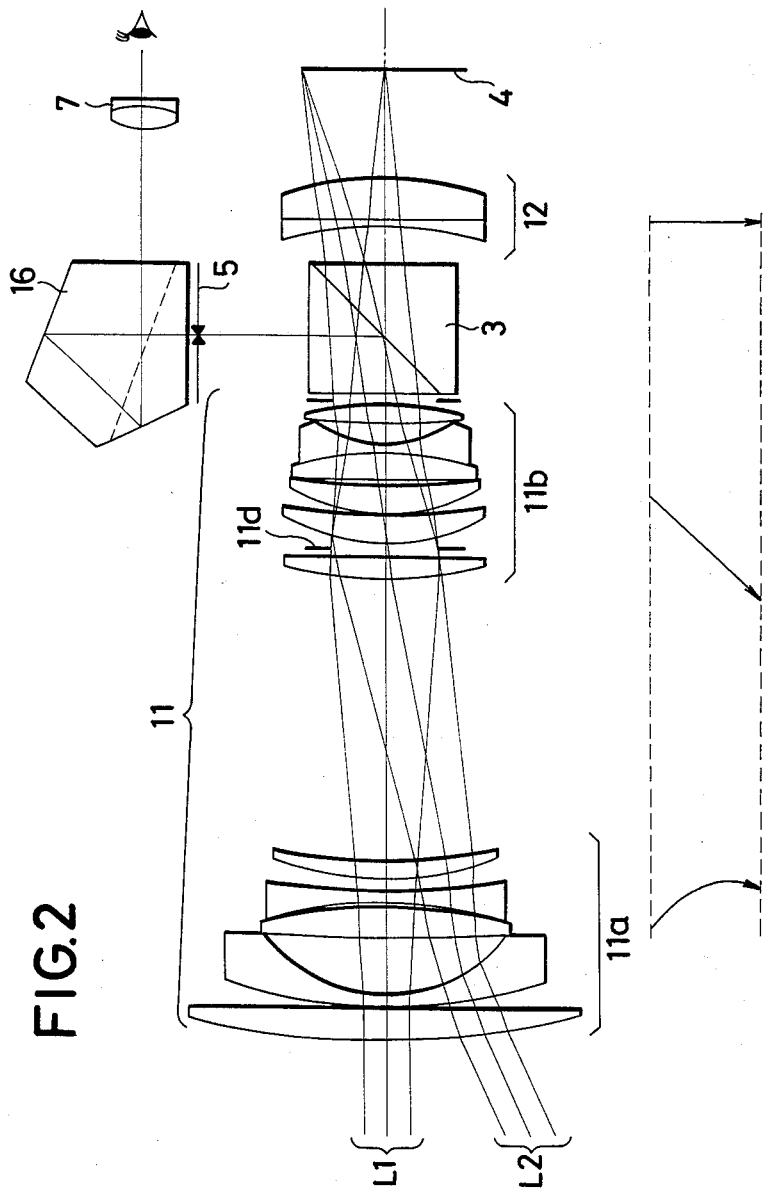

PHOTOGRAPHIC APPARATUS

BACKGROUND OF THE INVENTION

1. Field of the Invention

This invention relates to photographic apparatus of the single lens reflex type having an objective and a finder for observing an image formed with light passing through the objective.

2. Description of the Prior Art

In the art of 35 mm single lens reflex cameras, it has been the common practice that a reflex mirror is used in between the objective and the film plane to take a finder-image forming light beam out of the light from the objective, by which the finder image on the focusing screen is formed to the same magnification to that of the image to be formed on the film plane, and a pentagonal roof type prism is used for laterally inverting the finder image so that a correct image can be observed through the eyepiece.

Recent efforts at a further minimization of the sizes of photographic lenses have made considerable progress, but the sizes of the reflex mirror and the focusing screen, because the size of area of one frame of film is constant, appears substantially impossible to reduce. The pentagonal roof type prism also, because its having a large volume in itself owing to the geometrical configuration and because the sizes of all its faces are dependent on the size of the focusing screen, is very difficult to reduce in size. These parts thus give an obstacle to progress in minimizing the size of the entire body of the camera system.

SUMMARY OF THE INVENTION

An object of the present invention is to achieve a further minimization of the size of a camera system without having to change the size of an image frame on the photographic film or the like.

A second object is to achieve a large reduction in the size of the observing system, particularly the roof type reflector.

BRIEF DESCRIPTION OF THE DRAWINGS

FIG. 2 is similar to FIG. 1 except that a second embodiment is illustrated.

DETAILED DESCRIPTION OF THE PREFERRED EMBODIMENTS

Figure 1:
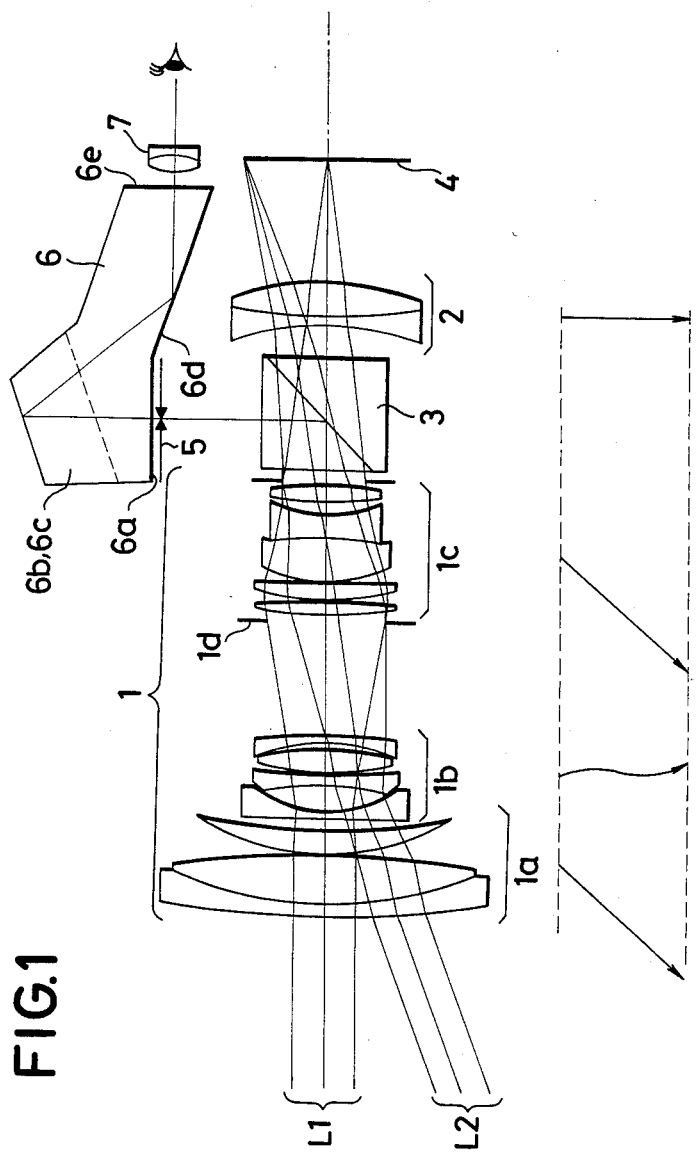
FIG. 1 is a longitudinal section view of a first embodiment of a photographic apparatus according to the present invention.

In FIG. 1, a front lens unit 1 and a rear lens unit 2 constitute an objective. The front lens unit 1 has a positive overall refractive power and is able in itself to form an image of an object. In the front lens unit 1 there are, from front to rear, a positive lens group 1a, a negative lens group 1b and a positive lens group 1c, all of which axially move along respective loci as shown in expanded form to vary the image magnification while compensating for the image shift. Focusing is performed by imparting an independent axial movement to the first lens group 1a. An aperture stop 1d is positioned ahead of the third lens group 1c to determine the F-number. The rear lens unit 2 has a negative refractive power. A beam splitter 3, in the form of a block is constructed from two prisms with a half-reflection mirror between their adjoining surfaces, is positioned in a space between the front and rear lens units 1 and 2. An image plane 4 is in coincidence with the photographic film or the image receiving surface of a solid state image pickup device.

A focusing screen 5, a roof type prism 6 having an entrance face 6a, a pair of roof type reflection faces 6b and 6c, a second reflection face 6d and an exit face 6e, and an eyepiece 7 are arranged on a common optical axis to constitute an observing system.

The choice of such a power distribution over the front and rear lens units 1 and 2 results in that an object image formed on the focusing screen 5 with light emerging from the front lens unit 1 and reflected by the beam splitter 3 is smaller than that formed on the photographic film 4 or the like by the objective. This reduction of the magnification of the finder image provides the possibility of reducing the size of the observing system, particularly the prism. Light issuing from the image on the focusing screen 5 is reflected from the roof type reflection faces 6b and 6c successively to the second reflection face 6d and therefrom further reflected to the exit face 6e, reaching an eye of the observer looking through the eyepiece 7.

To install such an apparatus in a camera, while the beam splitter 3 rear lens unit 2, film 4, prism 6 and eyepiece 7 lie within the camera body, a lens barrel containing the front lens unit 1 may be either releasably attached or fixedly secured to the camera body.

In FIG. 2 there is shown another embodiment of the invention in which the beam splitter 3, the image receiver 4, focusing screen 5 and eyepiece 7 are the same as in the foregoing embodiment, but a front lens unit 11 of positive power is otherwise constructed with a first lens group 11a of negative power and a second lens group 11b of positive power, both of which axially move along respective loci to effect zooming.

A rear lens unit 12 of negative power remains stationary during zooming. 11d is an aperture stop; and 16 is an ordinary pentagonal roof type prism. Even in this embodiment, the image formed on the focusing screen 5 by the front lens unit 11 alone is reduced in magnification as compared with the image focused on the image receiver 4 by the complete objective.

Such a photographic apparatus has additional optical features which are explained below. The first and second embodiments both have the aperture stop 1d or 11d within the front lens unit 1 or 11. While in the prior known single lens reflex cameras the beam splitter 3 takes its place behind the objective, it is in the present invention that the beam splitter 3 is disposed at a middle point in the objective as it approaches the aperture stop very near. This allows for minimization of the size of the beam splitter, as will be seen from how far the oblique beam L2 goes away from the optical axis.

Another feature is that the front lens unit 1 or 11 has a range of smaller focal lengths than those of the entire lens system. Since the angle of incidence $\theta$ the marginal oblique ray makes with the optical axis at the frontmost surface of the entire system is determined by the focal length f of the entire system, the image height: $Y = f \cdot \tan\theta$ by the front lens unit 1 or 11 alone is smaller than that on the image receiver 4.

For, as the image formed by the front lens unit 1 or 11 is observed through the eyepiece 7, it is inverted vertically and laterally, a pentagonal roof type prism 6 or 16, or the like must be used. This prism 6 or 16 also can therefore be reduced in size from the heretofore possible value.

And in this case, it is desired to take consideration of the following condition:

$$0.6 < Fa/F < 0.97$$

where F is the shortest focal length of the objective (the front and rear lens units in combination) and Fa is the focal length of the front lens unit in that zooming position.

When above the upper limit of the inequalities of condition, a significant reduction of the size of the prism 6 or 16 for the viewfinder system is difficult. When the lower limit is exceeded, the magnification of the finder image is so much reduced, and the prism 6 or 16 also can be reduced in suit with. But, the size of area of the frame in the finder (usually called "finder magnification") becomes to small to allow for comfortable viewing.

An example of a specific objective shown in FIG. 1 is adapted to be used with the 35 mm camera. As will be seen from its numerical data listed later, it is a zoom lens of a range from 35 mm to 98.5 mm with the front lens unit 1 of a range from 27.56 to 77.53 mm which are 0.787 times as large as those of the entire system. Therefore, each side of the focusing screen can be reduced by that amount, and the prism 6 also can be reduced in volume.

The prism 6 herein used is not of the form that the reflected light from the roof faces goes forward as in the pentagonal roof type prism, but of a form that the light from any reflection face is directed as near to the eyepiece 7 as possible, thereby giving an advantage of increasing the magnification of the finder.

Another example of a specific zoom lens shown in FIG. 2 (whose power distribution will be described later) has a range of 29 mm to 81.33 mm with a range of the front lens unit 11 being from 26.4 to 74.38 mm which are 0.91 times as large as those of the entire system.

Though, in the above-described examples, the front lens unit 1 or 11 employs the lens type capable of zooming, it may be a fixed focal length type lens. Another modification is that the beam splitter 3, instead of the half-reflection mirror, may be in the form of quick return mirror. Also instead of using the reflected light of the beam splitter, its transmitted light may be directed to the observing system.

The numerical data in accordance with which the objective of FIG. 1 can be constructed are listed below for the radii of curvature, R, the axial thicknesses and air separations, D, and the refractive indices Nd and Abbe numbers $\nu d$ for d-line of the spectrum of the glasses from which the various lens elements are made. The lens surfaces R1 to R5 constitute the first group 1a, R6 to R13 constitute the second group 1b, R14 is an aperture stop 1d, R15 to R23 constitute the third lens group 1c, R24 is a diaphragm, R25 and R26 define a beam splitter 3, and R28 to R30 constitute the rear unit 2.

EXAMPLE 1

| | R | D | Nd | $\nu d$ |
|---|---|---|---|---|
| | | f = 36.3-102 | | |
| 1 | 231.69 | 2.25 | 1.80518 | 25.40 |
| 2 | 60.86 | 7.86 | 1.60311 | 60.70 |
| 3 | −113.75 | 0.12 | 1. | |
| 4 | 33.0 | 4.00 | 1.60311 | 60.70 |
| 5 | 65.0 | Variable | 1. | |
| 6 | 180.32 | 1.20 | 1.80400 | 46.60 |
| 7 | 16.04 | 4.92 | 1. | |
| 8 | −44.41 | 1.15 | 1.83481 | 42.70 |
| 9 | 66.90 | 0.23 | 1. | |
| 10 | 30.47 | 4.50 | 1.80518 | 25.40 |
| 11 | −34.74 | 0.67 | 1. | |
| 12 | −22.94 | 1.15 | 1.80400 | 46.60 |
| 13 | −82.09 | Variable | 1. | |
| 14 | Stop | 1.00 | 1. | |
| 15 | 85.00 | 2.42 | 1.65160 | 58.60 |
| 16 | −103.53 | 0.10 | 1. | |
| 17 | 35.62 | 2.98 | 1.72000 | 50.20 |
| 18 | 189.21 | 0.10 | 1. | |
| 19 | 18.15 | 7.59 | 1.54072 | 47.20 |
| 20 | −140.51 | 2.46 | 1.84665 | 23.90 |
| 21 | 14.94 | 3.22 | 1. | |
| 22 | 52.19 | 2.90 | 1.59551 | 39.20 |
| 23 | −39.09 | Variable | 1. | |
| 24 | Stop | Variable | 1. | |
| 25 | ∞ | 18.00 | 1.51633 | 64.10 |
| 26 | ∞ | 2.50 | 1. | |
| 27 | | 4.70 | 1. | |
| 28 | −34.86 | 1.30 | 1.88300 | 40.80 |
| 29 | 83.90 | 8.50 | 1.56732 | 42.80 |
| 30 | −25.81 | | | |

| Separations during Zooming | | | | |
|---|---|---|---|---|
| f | 36.3 | 50 | 70 | 102 |
| D5 | 1.79 | 7.66 | 13.23 | 19.18 |
| D13 | 18.86 | 12.99 | 7.42 | 1.47 |
| D23 | 0.32 | 2.22 | 4.43 | 6.77 |
| D24 | 1.20 | 4.00 | 7.20 | 10.70 |

| | |
|---|---|
| Focal Length of first Group 1a | f1 = 67.068 |
| Focal Length of second Group 1b | f2 = −18.820 |
| Focal Length of third Group 1c | f3 = 27.341 |
| Focal Length of Rear Unit 2 | f4 = −301.326 |

EXAMPLE 2

| The Power Distribution over the lens of FIG. 2 for f = 29-81.33 | |
|---|---|
| Focal Length of first Group 11a | f1 = −47.748 |
| Focal Length of second Group 11b | f2 = 37.150 |
| Focal Length of Rear Unit 12 | f3 = −537.665 |

| Intervals between the Principal Points | | | |
|---|---|---|---|
| f | 29 | 50 | 81.33 |
| Between first and second Groups 11a and 11b | 56.605 | 28.407 | 13.253 |
| Between second Group 11b and Rear Unit 12 | 9.403 | 23.550 | 49.034 |

As has been described in greater detail above, according to the present invention, a viewfinder system, particularly an image correcting prism, of valuably reduced size is realized and can contribute to a further advance of compactness of cameras of the single lens reflex type along with the tendency of minimizing the size of the objective.

What is claimed is:

1. A photographic apparatus comprising:
   an objective including a front lens unit for forming a first object image at a position of finite distance, and a rear lens unit cooperating with said front lens unit to form a second object image of different magnification from that of said first object image, said rear lens unit having a negative refractive power;
   dividing means arranged between said front lens unit and said rear lens unit, for dividing a first light path of said objective into second and third light paths;
   observation means, arranged on said second light path, for observing said first object image; and image receiving means, arranged on said third light path, for receiving said second object image.

2. An apparatus according to claim 1, wherein said front lens unit is an optical system of variable magnifying power.

3. An apparatus according to claim 2, wherein said optical system includes a plurality of sub-units of lenses axially movable in differential relation.

4. An apparatus according to claim 2 wherein said optical system includes a stop for determining an F-number.

5. An apparatus according to claim 1, wherein said observation means includes a roof type reflector and an eyepiece.

6. An apparatus according to claim 5, wherein said observation means further includes a focusing screen.

7. An apparatus according to claim 5, wherein said roof type reflector is a prism having a pair of roof type reflection faces and another reflection face.

8. An apparatus according to claim 1, wherein said image receiving means comprises an image receiver on which said second object image is formed.

9. An apparatus according to claim 8, wherein said image receiver is silver-halide film.

10. An apparatus according to claim 8, wherein said image receiver is a solid state image pickup element.

11. A photographic apparatus comprising:
an objective including a front lens unit for forming a first object image at a position of finite distance, and a rear lens unit cooperating with said front lens unit to form a second object image of different magnification from that of said first object image;
dividing means arranged between said front lens unit and said rear lens unit, for dividing a first light path of said objective into second and third light paths;
observation means, arranged on said second light path, for observing said first object image; and
image receiving means, arranged on said third light path, for receiving said second object image, wherein said front lens unit is a zoom lens and said front lens unit and said rear lens unit are arranged to satisfy the following condition:

$$0.6 < Fa/F < 0.97$$

where Fa is the shortest focal length of said front lens unit, and F is the shortest focal length of said objective system comprising said front and said rear lens units.

12. A camera comprising:
a front lens unit including a plurality of sub-units axially movable in differential relation to form a first object image at a position of finite distance;
a rear lens unit cooperating with said front lens unit to form a second object image of different magnification from that of said first image;
beam splitting means positioned in a space between said front and said rear lens unit to split an optical path;
a viewfinder positioned in the optical path of the split-off light to observe said first image of the object and including a roof type prism and an eyepiece; and
an image receiver on which said second image of the object is formed, wherein said front lens unit and said rear lens unit are arranged to satisfy the following condition:

$$0.6 < Fa/F < 0.97$$

where Fa is the shortest focal length of said front lens unit, and F is the shortest overall focal length of said front and said rear lens units.

13. A photographic optical apparatus comprising:
dividing means for dividing a first light path into second and third light paths;
image forming optical means, arranged on said first light path, for forming a first object image on said second light path and a second object image on said third light path;
observation means, arranged on said second light path, for observing said first object image; and
image receiving means, arranged on said third light path, for receiving said second object image, said first object image having a smaller magnification than said second object image, wherein said image forming optical means has a front imaging lens unit on the object side of said dividing means and a rear lens unit of negative refractive power between said dividing means and said image receiving means.

* * * * *